United States Patent
Liu et al.

(10) Patent No.: US 7,502,786 B2
(45) Date of Patent: Mar. 10, 2009

(54) VISUAL METHOD AND APPARATUS FOR ENHANCING SEARCH RESULT NAVIGATION

(75) Inventors: Shixia Liu, ShangDi Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 11/619,665

(22) Filed: Jan. 4, 2007

(65) Prior Publication Data

US 2007/0162443 A1     Jul. 12, 2007

(30) Foreign Application Priority Data

Jan. 12, 2006    (CN)    .................. 2006 1 0001267

(51) Int. Cl.
  G06F 17/30    (2006.01)
  G06F 17/00    (2006.01)
(52) U.S. Cl. .................. 707/5; 707/4; 715/200
(58) Field of Classification Search ...... 707/5, 707/4; 715/200
See application file for complete search history.

(56) References Cited

U.S. PATENT DOCUMENTS

| 7,054,870 B2* | 5/2006 | Holbrook .................. 707/10 |
| 7,334,195 B2* | 2/2008 | Gemmell et al. ............ 715/841 |
| 2005/0144158 A1* | 6/2005 | Capper et al. .................. 707/3 |

* cited by examiner

*Primary Examiner*—Tony Mahmoudi
*Assistant Examiner*—Paul Kim
(74) *Attorney, Agent, or Firm*—Gibb & Rahman, LLC (57) ABSTRACT

A visual method for enhancing search result navigation, comprising: obtaining a first search result from a search engine; clustering the first search result to get clustering information; calculating the correlations between the clustering information and the ranked list of the first search result, and performing visualization processing on the clustering information; and displaying the visual cluster hierarchy and the ranked list of the first search result in a joint manner based on the correlations. When a cluster is selected, further searching is performed and the search result is clustered again. Using the present invention, through combining a traditional ranked list of search results and the visual cluster hierarchy of these search results to display them in a joint manner, a convenient way is provided for the web user to find the potential correlations between the visual cluster hierarchy and the ranked list of the search results. Besides, through dynamically searching and clustering more search results again, the web user may get more detailed and more accurate search results easily.

1 Claim, 6 Drawing Sheets

VISUAL METHOD AND APPARATUS FOR ENHANCING SEARCH RESULT NAVIGATION

TECHNICAL FIELD

The present invention relates to computer information processing technology, specifically, to a visual method and apparatus for enhancing the navigation of search results returned by a search engine.

TECHNICAL BACKGROUND

With the wide application of the Internet, people can get lots of information from the web. However, due to the rapid growth of the web contents, it becomes more and more difficult for web users to find required information rapidly and accurately. Currently, web users mainly rely on search engines to find required information. Generally, the process in which a web user uses a search engine to find required information is as follows: the web user submits a query, which may be, for instance, a single keyword or a combination of keywords, to the search engine. Then, the search engine produces a ranked list of the search results based on the submitted query. The ranked list is returned and displayed on the browser used by the web user. The web user obtains the part of the search results of interest to him through viewing segments of the returned ranked list of the search results.

However, such a method of using a search engine to find information commonly has a problem that the search engine always returns too many search results. In this situation, since the screen size of a computer display is limited, it is impossible to display all the search results simultaneously to the web user. Thus, the web user usually needs to browse many Web pages to find the required information, resulting in low efficiency of the web user getting information. On the other hand, according to an investigation of web users, in most cases, a web user only looks at the first few web pages of the ranked list of search results. Thus, in fact, the search quality of a web user searching information is also very low.

In order to improve search quality, some methods for improving the browsability of search results have been proposed in recent years. Vivisimo Company proposed a solution in which the search results returned by a search engine are clustered and the clustering results are visually displayed together with the ranked list of the search results. Although this solution may provide a convenient way for web users to know the clustering of the search results, it only displays the clustering results and the ranked list of search results simultaneously but independently, without presenting their correlations clearly and visually to the web users. Besides, the solution only clusters and displays part of the search results (for instance, the first 210 search results); if the web user selects a clustering item in the clustering results, the search results contained in the clustering item will be displayed, but no more relevant search results can be produced, so the web user cannot get more information of interest.

SUMMARY OF THE INVENTION

The present invention is proposed just based on the above technical problems that exist in the prior art. The objective of the present invention is to provide a visual method and apparatus for enhancing search result navigation, whereby the traditional ranked list of the search results and the visual cluster hierarchy of the search results may be displayed in a joint manner and more search results may be obtained dynamically, so as to help web users to get required information rapidly and accurately.

According to an aspect of the present invention, there is provided a visual method for enhancing search result navigation, comprising the following steps:

obtaining a first search result from a search engine;

clustering the first search result to get clustering information;

calculating the correlations between the clustering information and the ranked list of the first search result, and performing visualization processing on the clustering information; and displaying the visual cluster hierarchy and the ranked list of the first search result in a joint manner based on the correlations.

Preferably, the first search result contains a predetermined number of search result entries in the search results produced by the search engine based on a query.

Preferably, displaying the visual cluster hierarchy and the ranked list of the first search result in a joint manner comprises any one of the following:

a. when the pages of the ranked list of the first search result are displayed, the cluster(s) in the visual cluster hierarchy that contains the most search result entries of the first search result is highlighted;

b. when the pages of the ranked list of the first search result are displayed, the cluster(s) in the visual cluster hierarchy that contains most of the search results in the first page of the first search result is highlighted;

c. when a search result entry in the ranked list of the first search result is selected, the cluster(s) in the visual cluster hierarchy that contains the search result entry and the most search result entries of the first search result is highlighted;

d. when a search result entry in the ranked list of the first search result is selected, the cluster(s) in the visual cluster hierarchy that contains the search result entry and the most search result entries of the first search result in the first page is highlighted; and e. when a cluster in the visual cluster hierarchy is selected, the ranked list of the search result entries in the first search result that are contained in the cluster is displayed.

Preferably, the method according to the present invention further comprises the following steps:

selecting a cluster in the visual cluster hierarchy; generating new query keywords and submitting them to the search engine;

generating a new search result based on the new query keywords by the search engine;

selecting a predetermined number of search result entries in the new search result to produce a second search result;

clustering the second search result to obtain sub-clustering information;

calculating the correlations between the sub-clustering information and the ranked list of the second search result, and performing visualization processing on the sub-clustering information;

displaying the visual sub-clustering information and the ranked list of the second search result in a joint manner based on the correlations; and when a visual sub-clustering information item in the visual sub-clustering information is selected, repeating the above steps.

Preferably, the step of generating new query keywords comprises: combining the current query keywords with the name of the selected cluster to generate new query keywords.

Preferably, the step of generating new query keywords comprises:
- collecting relevant documents;
- determining keywords in the relevant documents; and
- combining the keywords with the current query keywords to generate new query keywords.

According to another aspect of the present invention, there is provided a visual apparatus for enhancing search result navigation, comprising:
- a dynamic cluster constructor configured to select search results coming from a search engine to get a first search result and dynamically cluster the first search result to generate clustering information;
- a correlation processor configured to calculate the correlations between the clustering information and the ranked list of the first search result; and
- a visualization engine configured to perform visualization processing on the clustering information to produce visual cluster hierarchy, and display the visual cluster hierarchy and the ranked list of the first search result on a browser in a joint manner based on the correlations.

Preferably, the dynamic cluster constructor comprises:
- a search result selecting unit configured to select a predetermined number of search result entries from the received search result to generate a first search result and save the first search result; and
- a clustering unit configured to cluster the first search result to generate clustering information.

Preferably, the visual apparatus for enhancing search result navigation further comprises:
- a keyword generator configured to generate new query keywords when a cluster in the visual cluster hierarchy is selected and send the keywords to the search engine through the dynamic cluster constructor;
- wherein, the search engine performs searching based on the new query keywords generated by the keyword generator and returns a ranked list of the new search result;
- the search result selecting unit of the dynamic cluster constructor selects a predetermined number of search result entries from the received ranked list of the new search result to generate a second search result and save it;
- the clustering unit of the dynamic cluster constructor clusters the second search result to generate sub-clustering information;
- the visualization engine visualizes the clustering information and the sub-clustering information into a tree structure, wherein the clustering information items contained in the clustering information are taken as root nodes and the sub-clustering information items contained in the sub-clustering information are taken as branch nodes, and the visualization engine also displays the visual cluster hierarchy and the ranked list of the second search result in a joint manner on the browser.

Preferably, the keyword generator comprises:
- a document collector configured to collect relevant documents;
- a weight calculator configured to calculate weights of all words except stopwords in each one of the relevant documents; and
- a keyword combiner configured to select the words with high weights and combine them with the current query keywords to generate new query keywords.

According to yet another aspect of the present invention, there is provided a browser that comprises the visual apparatus for enhancing search result navigation.

According to still another aspect of the present invention, there is provided a search engine that comprises the visual apparatus for enhancing search result navigation.

According to further another aspect of the present invention, there is provided a program product, comprises: program codes for implementing the method; and carrying media for carrying the program codes.

DETAILED DESCRIPTION OF THE INVENTION

It is believed that the above and other objectives, features and advantages of the present invention will become more apparent through the following detailed description of particular embodiments of the present invention taken in conjunction with the drawings.

Figure 1:
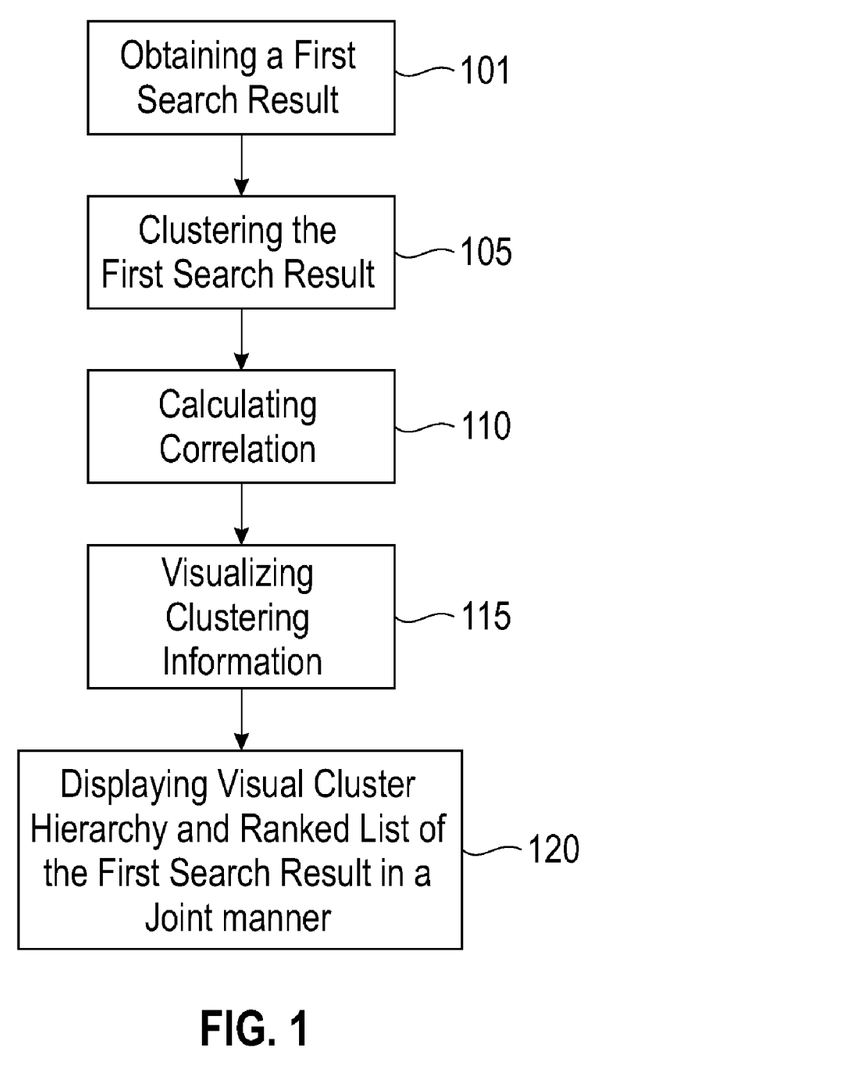
FIG. 1 is a flowchart of a visual method for enhancing search result navigation according to an embodiment of the present invention.

FIG. 1 is a flowchart of a visual method for enhancing search result navigation according to an embodiment of the present invention.

As shown in FIG. 1, first in Step 101, a first search result is obtained from a search engine. When the search engine receives a query submitted by a web user, a search result may be generated based on the query. The search result includes a plurality of documents, each of which constitutes a search result entry. Usually, a web user submits a query through a browser, which may be, for instance, an IE browser from Microsoft Company, a Netscape browser from Netscape Company or the like, and the search engine may be a known search engine such as Google or Yahoo!. As known by those skilled in the art, a query is usually in the form of a single keyword or a combination of keywords, and conforms to the format as defined by the engine being used.

After obtaining the first search result, in Step 105, the first search result is clustered so as to get the clustering information of the search result. The clustering operation is performed on the first search result by using a clustering algorithm based on the similarities between the segments of the documents in the search result. In this way, the documents related to a subject may be collected into a cluster. In order to ensure that the search engine still works in real time, the adopted clustering algorithm should not introduce a substantial delay. The clustering algorithm takes document snippets as input and the generated clustering information has a readable description content that is convenient for a web user to browse quickly. Next, a detailed description will be given to the process of clustering the first search result using a clustering algorithm. In this embodiment, preferably, the Suffix Tree Clustering (STC) algorithm is used as the clustering algorithm. STC algorithm is a fast, incremental and linear time clustering algorithm for clustering web search results. Its basic idea is to identify phrases that are common to a set of documents obtained as the search results. First, a base cluster is defined to be a set of documents that share a common phrase. Then each document in the search result is preprocessed, that is, the string of text representing each document is transformed using a stemming algorithm, sentence boundaries are marked, and non-word tokens, such as numbers, HTML tags and most punctuations, are stripped. After that, base clusters are identified using a suffix tree, which step can be viewed as creating an inverted index of phrases for the set of documents. Finally, these identified base clusters are merged into clusters and the common phrases may be used as the names of the clusters.

Here the STC algorithm is only taken as an example of clustering algorithms. Those skilled in the art may use any other suitable clustering algorithm to cluster the search results.

Figure 2:
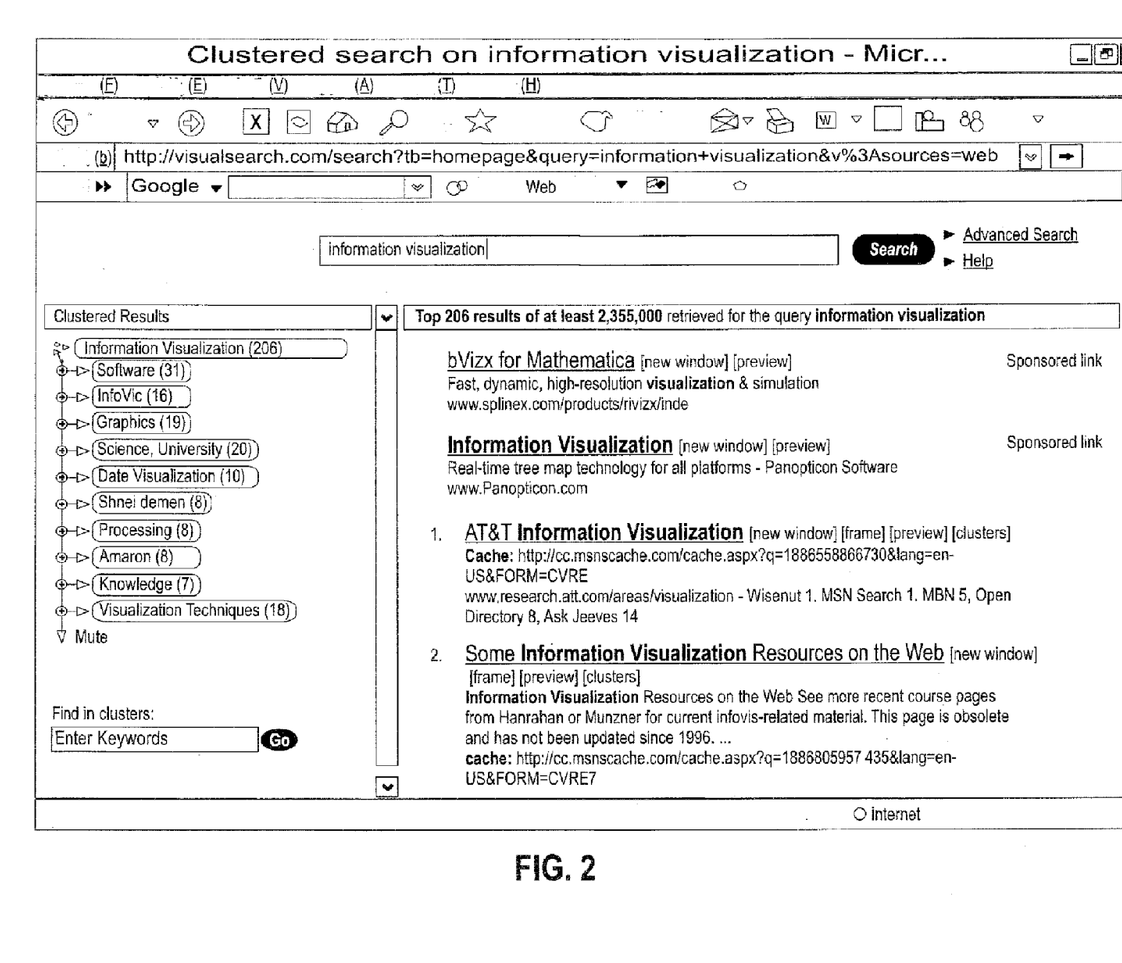
FIG. 2 is a schematic diagram of the display of a browser after using the visual method for enhancing search result navigation of the embodiment shown in FIG. 1.

To make the clustering process fast, preferably, the first search result contains only a predetermined number of search result entries in the search result produced by the search engine, for instance, in the example shown in FIG. 2, the first search result contains the first 206 documents in the ranked list of the search result. The number of documents in the first search result may be set by the web user through the user interface of the browser, and may affect the time for performing the clustering operation.

After getting the clustering information of the first search result, in Step 110, the correlations between the clustering information and the ranked list of the first search result are calculated. The correlations comprise, for instance, at least one of following information: each clustering information item in the clustering information contains which of search result entries of the first search result, the numbers of the search result entries contained in each clustering information item, in which clustering information items each search result entry is contained, which clustering information item contains the most search result entries, and which clustering information item contains the most search result entries of the first page and so on.

Of course, the above listed examples of the correlations are only illustrative, and this embodiment is not limited thereto. Those skilled in the art can use any other suitable information representing the correlations.

In Step 115, visualization processing is performed on the obtained clustering information, including representing the clustering information in a form visible to the web user, preferably, by using a tree visualization technique to represent a clustering tree structure; and describing the attributes of various clustering information items in the clustering information, such as, the name of each clustering information item, the number of search result entries contained therein and the like. After the visualization processing, the clustering information becomes visual cluster hierarchy for displaying on the browser to the web user.

Although in this embodiment Step 110 of calculating the correlations between the clustering information and the ranked list of the first search result is performed before Step 115 of performing visualization processing on the clustering information, essentially, these two steps may be performed in parallel without strict order. As an alternative, Step 115 of performing visualization processing on the clustering information may be performed first, and then Step 110 of calculating the correlations between the clustering information and the ranked list of the first search result may be performed. Then in Step 120, the visual cluster hierarchy generated in Step 115 and the ranked list of the first search result are displayed in a joint manner, so as to help the web user to locate search result entries of interest more easily and know the clustering of the search result entries in the first search result as the whole.

Displaying the clustering information and the ranked list of the first search result in a joint manner in Step 120 comprises the following cases:

1) When the pages of the ranked list of the first search result are displayed on the browser, the cluster in the visual cluster hierarchy that contains the most search result entries of the first search result is highlighted, that is, the cluster that contains the most search result entries is highlighted. Thus, the web user can easily know which cluster contains the most search result entries.

Preferably, in this case, in the visual cluster hierarchy the cluster that contains the most search result entries of the first search result in the first page may be highlighted. Because usually the search result entries displayed in the first page have high correlation with the query submitted by the web user, the web user is more concerned with the clustering of the search result on this page, so highlighting such a cluster makes the web user locate the content of interest more conveniently.

2) When a search result entry in the ranked list of the first search result is selected, in the visual cluster hierarchy the cluster that contains the search result entry and the most search result entries of the first search result is highlighted, that is, the cluster to which the selected search result entry belongs and which contains the most search result entries of the first search result is highlighted. Thus, the web user can get help to quickly know the cluster to which the selected search result entry belongs and which has the most search result entries.

Preferably, in this case, the cluster in the visual cluster hierarchy that contains the selected search result entry and the most search result entries of the first search result in the first page can be highlighted. Thus, the web user can get help to quickly know the cluster to which the selected search result entry belongs and which has the most search result entries in the first page.

3) When a cluster in the visual cluster hierarchy is selected, the ranked list of the search result entries in the first search result that are contained in the cluster is displayed, that is, the specific search result entries contained in the selected cluster are displayed, enabling the web user to know the specific content of the selected cluster.

From the above description it can be seen that, using the visual method for enhancing search result navigation according to this embodiment, through combining a traditional ranked list of search results and the visual cluster hierarchy of these search results to be displayed in a joint manner, a convenient way is provided for the web user to find the potential correlations between the visual cluster hierarchy and the ranked list of the search results, making the web user to locate the required content more easily.

Referring to FIG. 2 that schematically shows a display of a browser after using the visual method for enhancing search result navigation of the embodiment as shown in FIG. 1, a detailed description will be given to an example in which the visual method for enhancing search result navigation according to this embodiment is practically applied.

As shown in FIG. 2, the example applies an IE browser, which is well known by those skilled in the art, and the query keywords submitted by the web user are "information visualization". Based on these query keywords, the search engine "Google" generates a search result including at least 2,355,000 search result entries, wherein the first 206 search result entries are selected to be the first search result to be clustered and displayed. On the left of FIG. 2 the visual cluster hierarchy is displayed, wherein the clusters are displayed in the form of nodes and the name of each cluster and the number of search result entries contained therein are also displayed; on the right of FIG. 2, the ranked list of the first 206 search result entries in the first page is displayed. According to the above description, in this case, it is needed to highlight the cluster that contains the most search result entries or the cluster that contains the most search result entries in the first page. In FIG. 2, the cluster InfoVis is highlighted in the form of a dark node, and contains 18 search result entries. The way of the highlighting may be high brightness displaying, enlarged displaying or using a different color from that of the other clusters. From this it can be seen that, in the search result displayed in the first page, the cluster InfoVis contains the most search result entries. Through such a kind of displaying, the web user can clearly know the clustering of the search results and the most important clustering information item in the clustering information.

Figure 3:
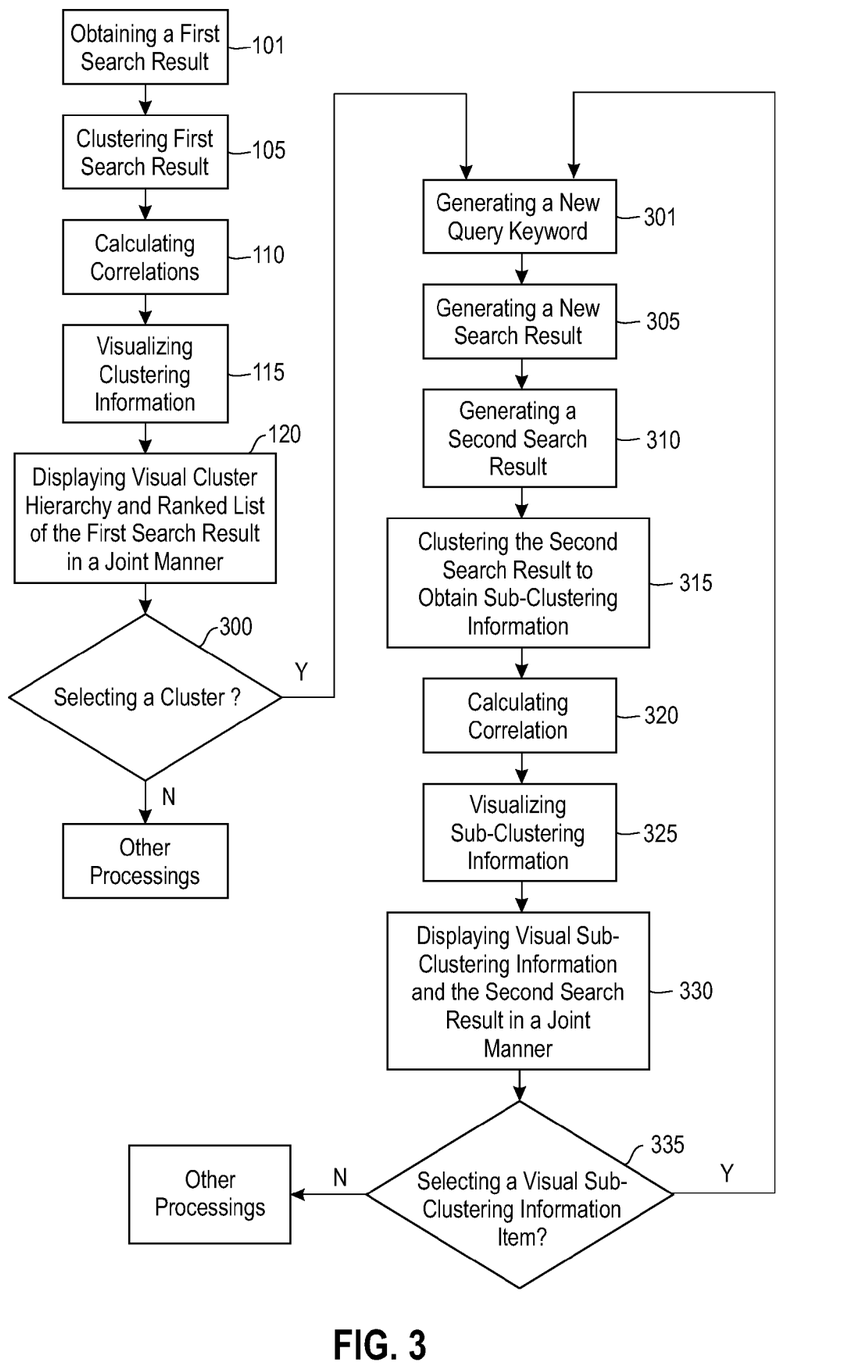
FIG. 3 is a flowchart of a visual method for enhancing search result navigation according to another embodiment of the present invention.

FIG. 3 is a flowchart of a visual method for enhancing search result navigation according to another embodiment of the present invention. Next, in conjunction with FIG. 3, a description of this embodiment will be given, wherein for the parts similar to those in the embodiment shown in FIG. 1 the same notations will be used and their explanations will be omitted properly.

This embodiment is characterized by further searching for the search results related to the cluster selected by the web user and merging them into the cluster, and then performing clustering once more.

As shown in FIG. 3, in Step 300, if the user selects a cluster in the visual cluster hierarchy, after this selection step 300, in addition to displaying the ranked list of the search result entries in the first search result that are contained in this cluster, the following operations may further be performed: in Step 301, generating new query keywords and submitting them to the search engine. In order to search for more search results related to the cluster, further qualifications on the current query keyword is needed in order to generate new query keywords and submit them to the search engine. The new query keywords may be generated through combining the current query keywords with the name of the selected cluster, as in the example shown in FIG. 2, if the web user selects a cluster "Software", the new query keyword would be "information visualization+software". In Step 305, the search engine generates a new search result based on the new query keywords. Then in Step 310, a predetermined number of search result entries, for instance, 300 search result entries, are selected from the new generated search result, so as to generate a second search result. Preferably, the second search result can be generated through merging these search result entries with the search result entries currently contained in the cluster, further facilitating the user to find the required information quickly.

Then, in Step 315, the second search result is clustered to obtain sub-clustering information. This step applies a clustering method similar to that used in the embodiment shown in FIG. 1, and its description is omitted here.

After obtaining the sub-clustering information, in Step 320, the correlations between the sub-clustering information and the ranked list of the second search result is calculated, wherein the content of the correlation information has been described in the above embodiments and its description is omitted here.

Then, in Step 325, visualization processing is performed on the sub-clustering information. In this embodiment, the visualization processing of the sub-clustering information is also to represent the sub-clustering information in the form of nodes, and depict the name of the sub-clustering information and the number of the search result entries contained. The sub-clustering information after the visualization processing becomes the visual sub-clustering information.

Although in this embodiment Step 320 of calculating the correlations is performed before Step 325 of visualization processing, essentially, these two steps may be performed in parallel without strict order. As an alternative, the step of visualization may be performed first, then the step of calculating the correlations may be performed.

In Step 330, the visual sub-clustering information and the ranked list of the second search result are displayed on the browser in a joint manner. Displaying the visual sub-clustering information and the ranked list of the second search result in a joint manner is similar to that in the embodiment shown in FIG. 1 and its description is omitted here.

In this embodiment, the visual cluster hierarchy and the sub-clustering information are displayed using a tree structure, wherein the clustering information items contained in the visual cluster hierarchy are root nodes and the visual sub-clustering information items contained in the visual sub-clustering information are branch nodes. Using a tree structure to display visual cluster hierarchy and visual sub-clustering information can make the web user clearly understand their relations, allowing the web user to drill up and down in different levels of the visual cluster hierarchy.

Besides, if the web user further selects a visual sub-clustering information item in the visual sub-clustering information (Step 335), Steps 301 to 330 will be repeated. If the web user continues to select a clustering information item in the next level clustering information of the visual cluster hierarchy, Steps 301 to 330 will further be repeated. Through such a repeated performing of the operation of "generating new query keywords—searching for a new search result—clustering", more accurate search results can be provided to the web user.

From the above description it can be seen that, using the visual method for enhancing search result navigation according to this embodiment, it is possible to dynamically search for more search results on the basis of the original limited search result and to cluster the combination of the new search results and the original search result, so as to form the clustering information at various levels together with the previous clustering information, making the web user to get more detailed and more accurate search result easily.

Figure 4:
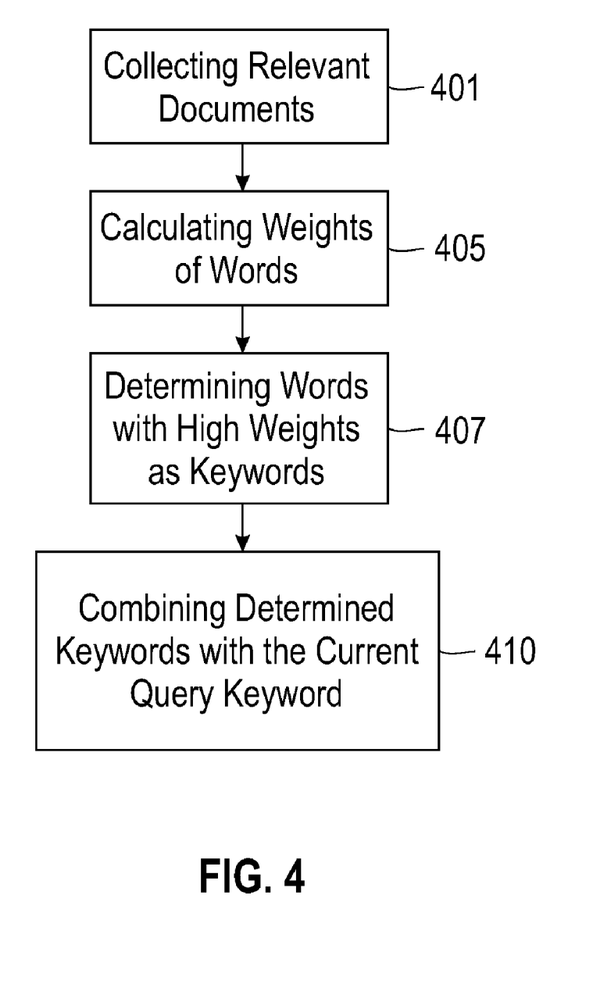
FIG. 4 is a flowchart of a example of generating new query keywords in the embodiment shown in FIG. 3.

As to how to generate new query keywords, in addition to the above mentioned method of combining the previous query with the name of the selected cluster to generate new query keywords, a method for generating new query keywords as shown in FIG. 4 may also be used. Next, in conjunction with FIG. 4, a detailed description will be given to the generation of new query keywords in the embodiment shown in FIG. 3.

As shown in FIG. 4, in Step 401, the relevant documents are collected. There are two kinds of relevant documents, that is, the documents that have been read by the web user or the documents that belong to the selected cluster.

Then, keywords in the collected relevant documents are determined. In this embodiment, the tf-idf method is used to determine keywords. First in Step 405, weights of all words except stopwords in each document of the collected relevant documents are calculated, wherein the "stopword" refers to those words having zero semantic value, such as "of", "the", "to" and the like. Since this kind of words appear in each document in high frequency but with no actual semantic meaning, the weights of this kind of words are not calculated. The formula for calculating the weight of a word with actual meaning is as follows:

$$value_i = tf \cdot idf,$$

where value represents the weight of a word; tf is the frequency of the term in the relevant document set; idf=all_documents/keyword_documents, where all_documents represents the number of all the relevant documents, keyword_documents represents the number of the relevant documents that contain this word. The formula (1) results in larger weights for terms that appear more frequently in the relevant documents, and larger weights for more unusual terms. Then in Step 407, the words with high weights are determined as keywords.

After determining the keywords, in Step 410, these keywords are combined with the current query keyword to generate new query keywords.

From the above description it can be seen that, using the method for generating new query keywords of this embodiment, it is possible to determine keywords more accurately based on the selection of and the documents read by the web user, and use the keywords to search for the content of interest to the web user.

Here, the method for generating new query keywords as shown in FIG. 4 is only illustrative and not restrictive. Those skilled in the art can apply any other suitable method for generating keywords.

Figure 5:
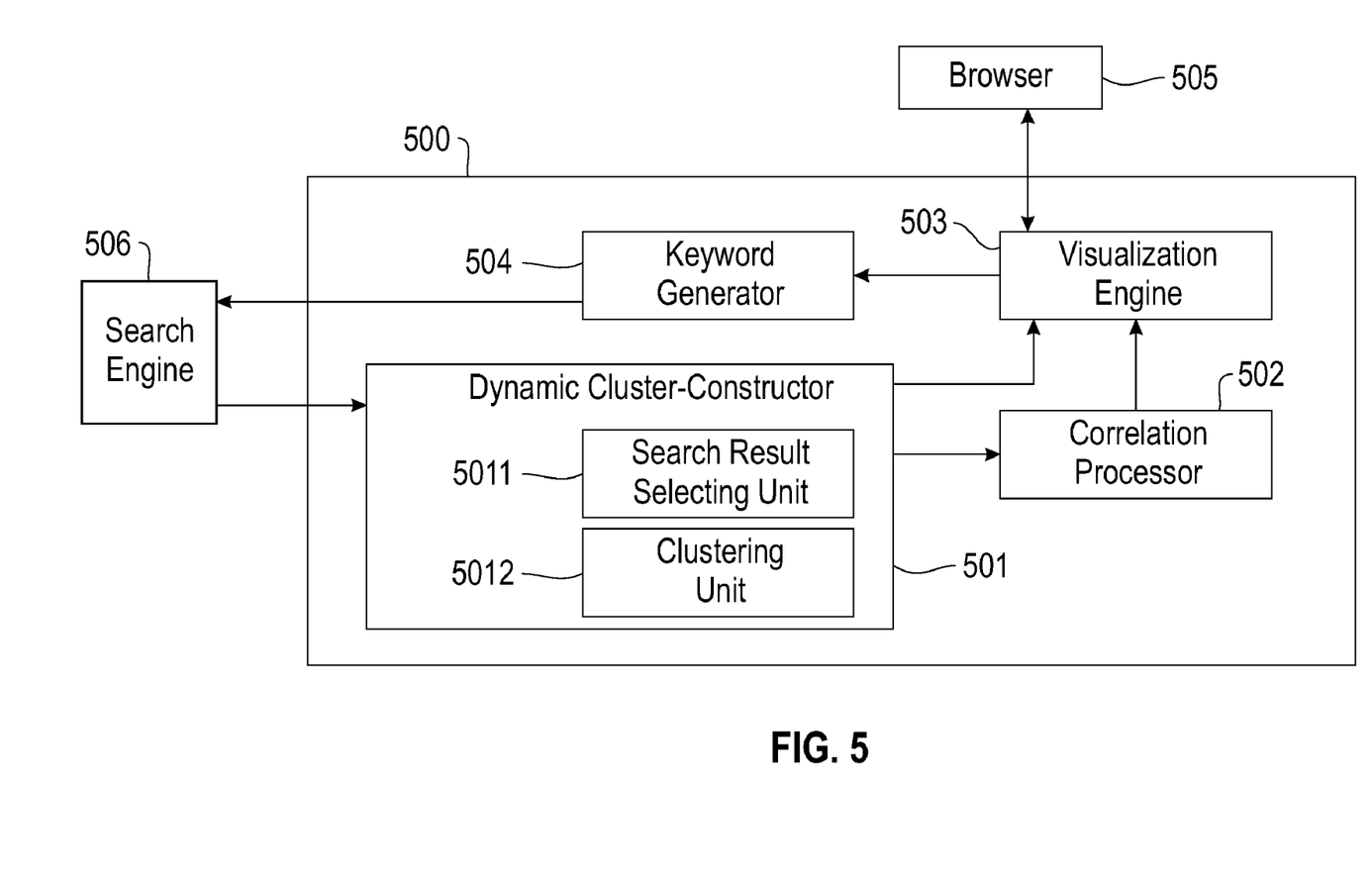
FIG. 5 is a block diagram of a visual apparatus for enhancing search result navigation according to an embodiment of the present invention.

Under the same inventive concept, FIG. 5 is a block diagram of a visual apparatus 500 for enhancing search result navigation according to an embodiment of the present invention. Next, in conjunction with FIG. 5, a detailed description will be given to this embodiment, in which the visual apparatus 500 for enhancing search result navigation is installed between a search engine 506 and a browser 505 as a separate apparatus.

As shown in FIG. 5, the visual apparatus 500 for enhancing search result navigation comprises: a dynamic cluster constructor 501, coupled to the search engine 506, and configured to dynamically cluster the search result from the search engine 506 to generate clustering information; a correlation processor 502 configured to calculate the correlations between the clustering information and the ranked list of the search result; a visualization engine 503, coupled to the browser 505, and configured to perform visualization processing on the clustering information to produce visual cluster hierarchy and display the visual cluster hierarchy and the ranked list of the search result on the browser 505 in a joint manner based on the correlations.

In this embodiment, the search engine 506 may be a known search engine, such as Google, Yahoo! or the like, and the browser 505 may be, such as, an IE browser from Microsoft Company, a Netscape browser from Netscape Company, or the like.

Next, a detailed description will be given to the specific operation process of the visual apparatus 500 for enhancing search result navigation.

When a web user submits a query through the browser 505, the query is transmitted to the search engine 506 through the visualization engine 503 of the visual apparatus 500. The query usually takes the form of a single keyword or a combination of keywords and conforms to the format defined by the search engine 506. The search engine 506 generates a search result based on the query. The search result contains a plurality of documents, each of which constitutes a search result entry. Then the search engine 506 returns a ranked list of the search result to the dynamic cluster constructor 501 of the visual apparatus 500.

Preferably, the dynamic cluster constructor 501 may further comprises: a search result selecting unit 5011 configured to receive the ranked list of the search result returned by the search engine 506 and select a predetermined number of search result entries from the ranked list of the received search result to generate a first search result and save the first search result; a clustering unit 5012 configured to cluster the first search result to generate clustering information and send the clustering information and the ranked list of the first search result to the correlation processor 502. In this embodiment, the clustering unit 5012 applies the Suffix Tree Clustering (STC) algorithm to perform the clustering, which algorithm has been described in detail above and its explanation is omitted here. Here the STC algorithm is taken only as an example of clustering algorithms, and those skilled in the art may use any other suitable clustering algorithm to cluster the search result.

After receiving the generated clustering information and the ranked list of the first search result from the dynamic cluster constructor 501, the correlation processor 502 calculates the correlations between them, the content contained in the correlation information having been described in the previous embodiments and its explanation being omitted here.

After calculating the correlations, the correlation processor 502 sends the clustering information, the ranked list of the first search result and their correlations to the visualization engine 503, which performs visualization processing, including representing the clustering information in a form readable to web user, depicting the attributes of the clustering information and the like.

Then the visualization engine 503 displays the visual cluster hierarchy and the ranked list of the search result on the browser 505 in a joint manner based on the correlations calculated by the correlation processor 502. The situations involved in the displaying in a joint manner have been described in the previous embodiments and their explanation is omitted here.

The visual apparatus 500 for enhancing search result navigation according to this embodiment and its components can be implemented in hardware circuits, such as super large-scale integrated circuits or gate arrays, semiconductors such as logic chips and transistors, or programmable hardware devices such as field programmable gate arrays and programmable logic devices, and also can be implemented in software executed by various kinds of processors, and further can be implemented in a combination of the above-mentioned hardware circuits and software.

From the above description it can be seen that, using the visual apparatus 500 for enhancing search result navigation according to this embodiment, through combining a traditional ranked list of search results and the visual cluster hierarchy of these search results to display them in a joint manner, a convenient way is provided for the web user to find the potential correlations between the visual cluster hierarchy and the ranked list of the search results, making the web user to locate the required content more easily.

Preferably, the visual apparatus 500 for enhancing search result navigation further comprises a keyword generator 504 configured to generate new query keywords when a cluster in the visual cluster hierarchy is selected and send the keywords to the search engine 506. In order to further help the web user to obtain more search result with higher relevance, when the web user uses the browser 505 to select a cluster in the visual cluster hierarchy, in addition to displaying the ranked list of the search result entries contained in the cluster, the web user's selection is also sent to the keyword generator 504 through the visualization engine 503. The keyword generator 504 generates new query keywords based on the selection. How to generate new keywords has been described in the previous embodiments and its explanation is omitted here. Preferably, the keyword generator 504 may receive the cluster selected by the user on the browser and transmitted by the visualization engine 503 to generate new keywords, and send the generated new keywords to the search engine 506 for further searching. The search engine 506 generates a ranked list of the new search result based on the new query keywords and returns it to the dynamic cluster constructor 501.

After receiving the returned ranked list of the new search result, the search result selecting unit 5011 of the dynamic cluster constructor 501 selects a predetermined number of search result entries, for instance, the first 200 search result entries, from the ranked list of the new search result, to generate a second search result and save it. Preferably, the selected search result entries can also be merged with those search result entries in the currently saved first search result that are contained in the selected cluster to form the second search result and the second search result is saved. Then, the clustering unit 5012 clusters the second search result to generate the sub-clustering information of the selected cluster. The sub-clustering information and the ranked list of the second search result are sent to the correlation processor 502.

Similarly, the correlation processor 502 calculates the correlations between the sub-clustering information and the ranked list of the second search result, and the content of the correlation information has been described in the above embodiments and its description is omitted here. Then, the correlation processor 502 sends the sub-clustering information, the ranked list of the second search result and their correlations to the visualization engine 503.

In addition to performing visualization processing on the sub-clustering information, the visualization engine 503 visualizes the clustering information and the sub-clustering information into a tree structure, wherein the clustering information items contained in the clustering information are taken as root nodes and the sub-clustering information items contained in the sub-clustering information are taken as branch nodes.

Then, based on the correlations between the sub-clustering information and the ranked list of the second search result, the visualization engine 503 directs displaying the sub-clustering information and the ranked list of the second search result in a joint manner on the browser 505.

If the web user continues to select a sub-clustering information item, the visual apparatus 500 for enhancing search result navigation may continue to generate new query keywords for the selected sub-clustering information item through the keyword generator 504, and search for a new search result and perform clustering through the dynamic cluster constructor 501, so as to generate visual cluster hierarchy at different levels to facilitate the web user to find the content of interest.

Alternatively, the keyword generator 504 can also be integrated into the visualization engine 503, and receive the selection of the web user through the visualization engine 503, generates new keywords based on the selection and sends them to the search engine 506 through the visualization engine 503.

From the above description it can be seen that, the visual apparatus 500 for enhancing search result navigation incorporated with the keyword generator 504 can dynamically search for more search result on the basis of the original limited search result and cluster the combination of the new search result and the original search result, so as to construct the clustering information at various levels together with the previous clustering information, making the web user to get more detailed and more accurate search result easily.

Figure 6:
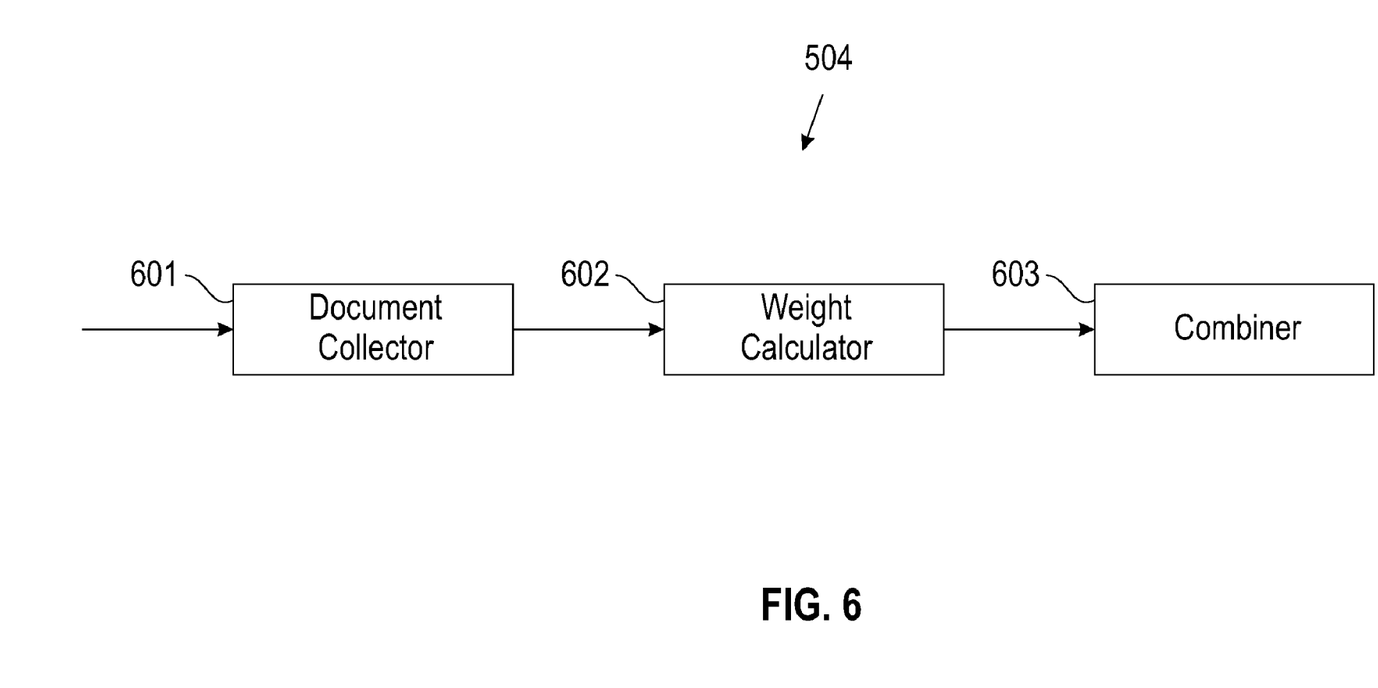
FIG. 6 is a block diagram of the keyword generator in the embodiment shown in FIG. 5.

FIG. 6 is a block diagram of an example of the keyword generator 504. Next, in conjunction with FIG. 6, a detailed description will be given.

As shown in FIG. 6, the keyword generator 504 comprises: a document collector 601 configured to collect relevant documents required for generating query keywords; a weight calculator 602 configured to calculate the weights of all the words except stopwords in each one of the relevant documents; and a keyword combiner 603 configured to select the words with high weights and combine them with the current query keywords to generate new query keywords.

When the keyword generator 504 receives a selection of the web user, the document collector 601 collects relevant documents required for generating new query keywords based on the selection, so as to determine new keywords from these relevant documents. The relevant documents collected by the document collector 601 are sent to the weight calculator 602, which calculates the weights of all the words except stopwords in each document. The keyword combiner 603 selects the words with high weights as new keywords and combines them with the current query keywords to generate new query keywords. How to collect the relevant documents and how to calculate the weights have been described in the previous embodiments and their explanation is omitted here.

The keyword generator 504 of this embodiment and its components can be implemented in hardware circuits, such as super-large scale integrated circuits or gate arrays, semiconductors such as logic chips and transistors, or programmable hardware devices such as field programmable gate arrays and programmable logic devices, and also can be implemented in software executed by various kinds of processors, and further can be implemented in a combination of the above-mentioned hardware circuits and software.

From the above description it can be seen that, using the keyword generator 504 of this embodiment, it is possible to determine keywords more accurately based on the selection of and the documents read by the web user, and use the keywords to search for the content of interest to the web user.

Besides, the above visual apparatus for enhancing search result navigation may be combined with an existing browser to form a new browser. The existing browser may be, for instance, an IE browser from Microsoft Company, a Netscape browser from Netscape Company or the like.

On the other hand, above visual apparatus for enhancing search result navigation may be combined with an existing search engine to form a new search engine. An existing search engine may be a know search engine, such as Google, Yahoo! or the like.

The present invention further provides a program product, comprising: program codes for implementing all the above methods and carrying media for carrying the program codes.

Though a visual method and corresponding apparatus for enhancing search result navigation of the present invention has been described in detail in conjunction with embodiments, it should be understand that those skilled in the art can make various modifications to the above-mentioned embodiments without departing from the spirit and scope of the present invention.

The invention claimed is:

1. A visual method for enhancing search result navigation, comprising:

obtaining a first search result from a search engine;

clustering the first search result to get clustering information;

calculating the correlations between the clustering information and a ranked list of the first search result, and performing visualization processing on the clustering information; and displaying the visual cluster hierarchy and the ranked list of the first search result in a joint manner based on the correlations, wherein the first search result contains a predetermined number of search result entries in the search results produced by the search engine based on a query;

wherein the displaying visual cluster hierarchy and the ranked list of the first search result in a joint manner comprises one of the following:

when the pages of the ranked list of the first search result are displayed, the cluster in the visual cluster hierarchy that contains the most search result entries of the first search result is highlighted;

when the pages of the ranked list of the first search result are displayed, the cluster in the visual cluster hierarchy that contains the most search result entries of the first search result in the first page is highlighted;

when a search result entry in the ranked list of the first search result is selected, the cluster in the visual cluster hierarchy that contains the search result entry and the most search result entries of the first search result is highlighted;

when a search result entry in the ranked list of the first search result is selected, the cluster in the visual cluster hierarchy that contains the search result entry and the most search result entries of the first search result in the first page is highlighted; and when a cluster in the visual cluster hierarchy is selected, the ranked list of the search result entries in the first search result that are contained in the cluster is displayed, wherein the step of clustering the first search result applies the Suffix Tree Clustering algorithm;

wherein said method further comprises repeatable steps comprising:

selecting a cluster in the visual cluster hierarchy;

generating new query keywords and submitting them to the search engine;

producing a new search result based on the new query keywords by the search engine;

selecting a predetermined number of search result entries in the new search result to produce a second search result;

clustering the second search result to obtain sub-clustering information;

calculating the correlations between the sub-clustering information and the ranked list of the second search result, and performing visualization processing on the sub-clustering information;

displaying the visual sub-clustering information and the ranked list of the second search result in a joint manner based on the correlations; and when a visual sub-clustering information item in the visual sub-clustering information is selected, repeating the repeatable steps, wherein the visual cluster hierarchy and the visual sub-clustering information form a tree structure, wherein the clusters contained in the visual cluster hierarchy are taken as root nodes and the visual sub-clustering information items contained in the visual sub-clustering information are taken as branch nodes, wherein the step of generating new query keywords comprises: combining the current query keywords with the name of the selected cluster to generate new query keywords, wherein the step of generating new query keywords comprises:

collecting relevant documents;

determining keywords in the relevant documents; and combining the keywords with the current query to produce a new query, wherein the relevant documents are the documents that have been read by the web user or the documents that belong to the selected cluster, and wherein the step of determining keywords in the relevant documents comprises:

calculating weights of all words except stopwords in each document of the relevant documents with the following formula:

$value_i = tf \cdot idf$, where value represents the weight of a word; tf represents the frequency at which the word appears in the relevant documents;

$idf = all\_documents / keyword\_documents$, where all documents represents the number of all the relevant documents, keyword documents represents the number of the relevant documents that contain this word; and determining the words with high weights as keywords.

* * * * *